US008816824B2

(12) United States Patent
Barry et al.

(10) Patent No.: US 8,816,824 B2
(45) Date of Patent: Aug. 26, 2014

(54) SYSTEM AND METHOD FOR MULTIPLE READING INTERFACE WITH A SIMPLE RFID ANTENNA

(75) Inventors: Fabien Barry, Aix en provence (FR); Jan-Manuel Collombon, Aix en provence (FR); Nicolas Fornier, Aix en provence (FR)

(73) Assignee: Psion Inc., Mississauga, Ontario (CA)

( * ) Notice: Subject to any disclaimer, the term of this patent is extended or adjusted under 35 U.S.C. 154(b) by 453 days.

(21) Appl. No.: 13/180,012

(22) Filed: Jul. 11, 2011

(65) Prior Publication Data
US 2012/0050017 A1 Mar. 1, 2012

(30) Foreign Application Priority Data

Aug. 27, 2010 (EP) ..................................... 10305924

(51) Int. Cl.
*G06K 7/01* (2006.01)
*H01Q 3/24* (2006.01)
*H01Q 1/22* (2006.01)
*G06K 7/10* (2006.01)
*H01Q 7/00* (2006.01)
*G06K 7/00* (2006.01)
*H01Q 21/28* (2006.01)

(52) U.S. Cl.
CPC ............... *G06K 7/0008* (2013.01); *H01Q 3/24* (2013.01); *H01Q 1/2216* (2013.01); *G06K 7/10336* (2013.01); *G06K 7/10386* (2013.01); *H01Q 7/00* (2013.01); *H01Q 21/28* (2013.01)
USPC ......................................... 340/10.1; 343/842

(58) Field of Classification Search
USPC .............. 340/571, 505, 572.7, 10.1; 342/146; 343/742, 702, 842, 841; 244/50; 235/385; 307/104; 324/322; 333/113; 600/410
See application file for complete search history.

(56) References Cited

U.S. PATENT DOCUMENTS 3,629,737 A * 12/1971 Wen .............................. 333/113
4,063,229 A * 12/1977 Welsh et al. .................. 340/571
(Continued)

FOREIGN PATENT DOCUMENTS

EP        1605391 A1    12/2005

OTHER PUBLICATIONS

European Search Report completed Mar. 3, 2011, from corresponding European Application No. EP 10 30 5924.

Primary Examiner — Steven Lim
Assistant Examiner — Kaleria Knox

(57) ABSTRACT

A multi-field antenna able to receive a signal over one field selected from a plurality of different fields of the antenna includes an interface to connect the antenna to a signal processing device, such as an RFID reader, to receive and process the signal. The antenna includes a first magnetic loop configured to be tuned by a first tuner to provide a first volume field for reading data; a second magnetic loop configured to be tuned by a second tuner to provide a second volume field for reading data, the second volume field being smaller than the first volume field; and a switch to configure the first tuner and the second tuner to select the one field from the plurality of fields. The multi-field antenna can have a wide volume field selected to detect items within a large area and then the multi-field antenna can be switched to select a smaller volume field to detect items within a substantially smaller area. In a preferred embodiment, the multi-field antenna further includes; a first metallic element configured to cover at least a portion of the second magnetic loop, the first metallic element comprising a slot extending from one end of the first metallic element to a point proximal an opposite end of the first metallic element. Also preferably, the multi-field antenna can also create a point volume field, smaller than the second volume field, to localize detected objects within a still smaller area.

18 Claims, 6 Drawing Sheets

(56) References Cited

U.S. PATENT DOCUMENTS

| | | | |
|---|---|---|---|
| 6,501,977 B1* | 12/2002 | Kimmlingen | 600/410 |
| 7,694,913 B2* | 4/2010 | Lindahl | 244/50 |
| 7,714,791 B2* | 5/2010 | Lavedas | 343/742 |
| 7,733,092 B2* | 6/2010 | Otake et al. | 324/322 |
| 8,063,760 B2* | 11/2011 | Volpi et al. | 340/505 |
| 8,274,437 B2* | 9/2012 | Qi et al. | 343/702 |
| 8,378,523 B2* | 2/2013 | Cook et al. | 307/104 |
| 2002/0088854 A1* | 7/2002 | Jo | 235/385 |
| 2006/0066441 A1 | 3/2006 | Knadle, Jr. et al. | |
| 2007/0222609 A1* | 9/2007 | Duron et al. | 340/572.7 |
| 2011/0309970 A1* | 12/2011 | Fontijn et al. | 342/146 |

\* cited by examiner

SYSTEM AND METHOD FOR MULTIPLE READING INTERFACE WITH A SIMPLE RFID ANTENNA

The present invention relates generally to RFID antennas and, more specifically, to an RFID antenna capable of selectively using one of multiple antenna fields to transmit and receive radio information.

BACKGROUND OF THE INVENTION

It is known to track and attempt to locate objects, such as sales goods, components, medical samples, documents, produce or other articles of commerce, during their manufacture, storage, transport and/or distribution. Wireless communication transponders may be attached to or associated with such objects to provide information about the objects such as their identification number, expiration date, date of manufacture, lot number, and the like. An example of such a wireless communication transponder is a radio frequency identification (RFID) tag.

In order to communicate with the wireless communication transponders, a wireless transmission interrogator is placed in proximity to the objects. An example of such a wireless transmission interrogator is an RFID reader. The RFID reader creates a radio frequency field with appropriate radio circuitry and an antenna to communicate with the RFID tag and to identify the object the tag is associated with.

There are generally three different types of RFID tags: active RFID tags; passive RFID tags; and battery assisted passive (BAP) RFID tags. Active RFID tags contain a battery and can transmit signals autonomously. Passive RFID tags have no battery and require an external source, typically a signal transmitted by the interrogator, to power signal transmission. BAP RFID tags require an external source to activate the tag, but their battery powers their transmission resulting in it having a greater range of operation.

However, all three types of RFID tags are designed to operate at relatively short range. Accordingly, the RFID reader's antenna must be placed into relatively close proximity to the RFID tag in order to read it. In order to address this, different antennas have been developed to provide different radio frequency field sizes for reading the RFID tags in different use cases.

Unfortunately, antennas that have a large field size typically have a low resolution. That is, for example, an antenna with a large field size could be used to locate a target box from within a plurality of boxes, but it probably could not locate a target item from within the target box. Conversely, an antenna with a relatively small field size could locate a target item from within a box of items, but could not locate the box containing the target item from a collection of possible target boxes. Thus, different antennas, or different RFID readers altogether, may need to be used to locate both the target box and the target item or for other particular use cases.

SUMMARY OF THE INVENTION

It is an object of the present invention to provide a novel system and method for locating objects which obviates or mitigates at least one disadvantage of the prior art.

In accordance with a first aspect of the present invention, there is provided a multi-field antenna which is able to receive a signal over one field selected from a plurality of different fields of the antenna, the multi-field antenna comprising: a first magnetic loop; a first tuner to tune the first magnetic loop to provide a first volume field for reading data; a second magnetic loop; a second tuner to tune the second magnetic loop to provide a second volume field for reading data, the second volume field being smaller than the first volume field; a first metallic element configured to cover at least a portion of the second magnetic loop; a switch to configure the first tuner and the second tuner to select the one field of the plurality of fields; and an interface to connect the multi-field antenna with a signal processing device operable to receive and process the signal.

Preferably, the first metallic element includes a slot extending along a length of the first metallic element from one end of the first metallic element to a point proximal an opposite end of the first metallic element. Also preferably, the slot comprises an aperture at the one end of the first metallic element and the multi-field antenna further comprises a ferrite nub coupled to the second magnetic loop at an end adjacent the aperture, the ferrite nub configured to provide a third volume field, the third volume field being smaller than the second volume field.

In accordance with another aspect of the present invention, there is provided a mobile computer device comprising: an RFID reader; memory having stored instructions; a microprocessor configured to implement the stored instructions for receiving and processing a signal from the RFID reader; and a multi-field antenna connected to the RFID reader, the multi-field antenna operable to receive a signal over one field selected from a plurality of different fields of the multi-field antenna and comprising: a first magnetic loop; a first tuner to tune the first magnetic loop to provide a first volume field for reading data from RFID tags; a second magnetic loop; a second tuner to tune the second magnetic loop to provide a second volume field for reading data from RFID tags, the second volume field being smaller than the first volume field; a first metallic element configured to cover at least a portion of the second magnetic loop; and a switch to configure the first tuner and the second tuner to select the one field from the plurality of fields.

Preferably, the first metallic element comprises a slot extending along a length of the first metallic element from one end of the first metallic element to a point proximal an opposite end of the first metallic element. Also preferably, the slot comprises an aperture at the one end of the first metallic element and the multi-field antenna further comprises a ferrite nub coupled to the second magnetic loop at an end adjacent the aperture, the ferrite nub configured to provide a third field, the third field being narrower than the second field.

Preferably, the switch is controlled by the microprocessor.

In accordance with yet another aspect of the present invention, there is provided a method of locating a target object from among a plurality of objects, each object including a wireless communication transponder, comprising the steps of: i) selecting a first field for a multi-field antenna operating with a wireless transmission interrogator, the first field being relatively large in volume; ii) with the selected first field, receiving signals from wireless communication transponders from at least two objects; iii) determining a first estimate of the location of the target object from the received signals within the first field; and iv) selecting a second field for the multi-field antenna, the second field being smaller in volume than the first field and determining a second estimate of the location of the target object within the second field, the second estimate being at least as accurate as the first estimate.

Preferably, the method further comprises the step of: v) receiving a signal from the wireless communication transponder of the target object with a third field for the multi-field antenna, the third field having a volume smaller than the second field, to provide a third estimate of the location of the target object. Also preferably, the wireless communication transponders are RFID tags and the wireless transmission interrogator is an RFID reader. Also preferably, the wireless transmission interrogator is operably connected to a mobile computer device.

BRIEF DESCRIPTION OF THE DRAWINGS

Embodiments of the present invention will now be described, by way of example only, with reference to the attached Figures in which.

DETAILED DESCRIPTION OF THE INVENTION

Figure 1:
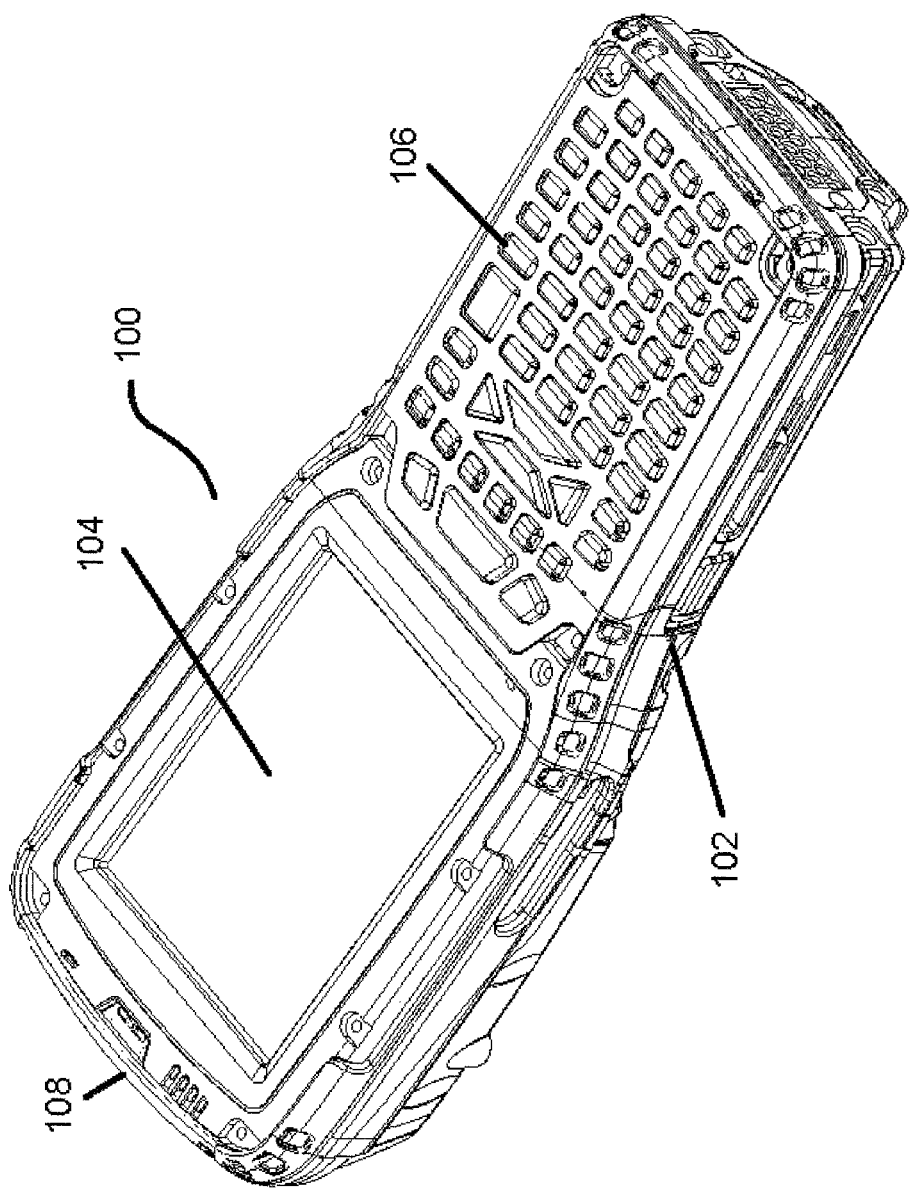
FIG. 1 shows a perspective view of the top and side of a mobile computer.

Referring to FIG. 1 a mobile computer is indicated generally at 100. Mobile computer 100 comprises a main body 102, a display 104, a keyboard 106, and an external antenna connector (not shown). In the present embodiment, the external antenna connector is preferably located beneath a protected cap or cover 108. Cap 108 protects the external antenna connector from water, dirt or other foreign elements when the multi-field antenna is not connected. Alternatively, the external antenna can be permanently installed on mobile computer 100 and/or may be integrally formed with main body 102.

Mobile computer 100 can have the capability to wirelessly communicate data and/or voice signals, to and from servers as well as data acquisition sources within a communication network.

One or more circuit boards or assemblies are housed within mobile computer 100 for providing the electronic components required to implement functionality provided by the mobile computer 100. It will be appreciated that various configurations of mobile computers having different internal and external components can be used without affecting the functionality of the invention.

Figure 2:
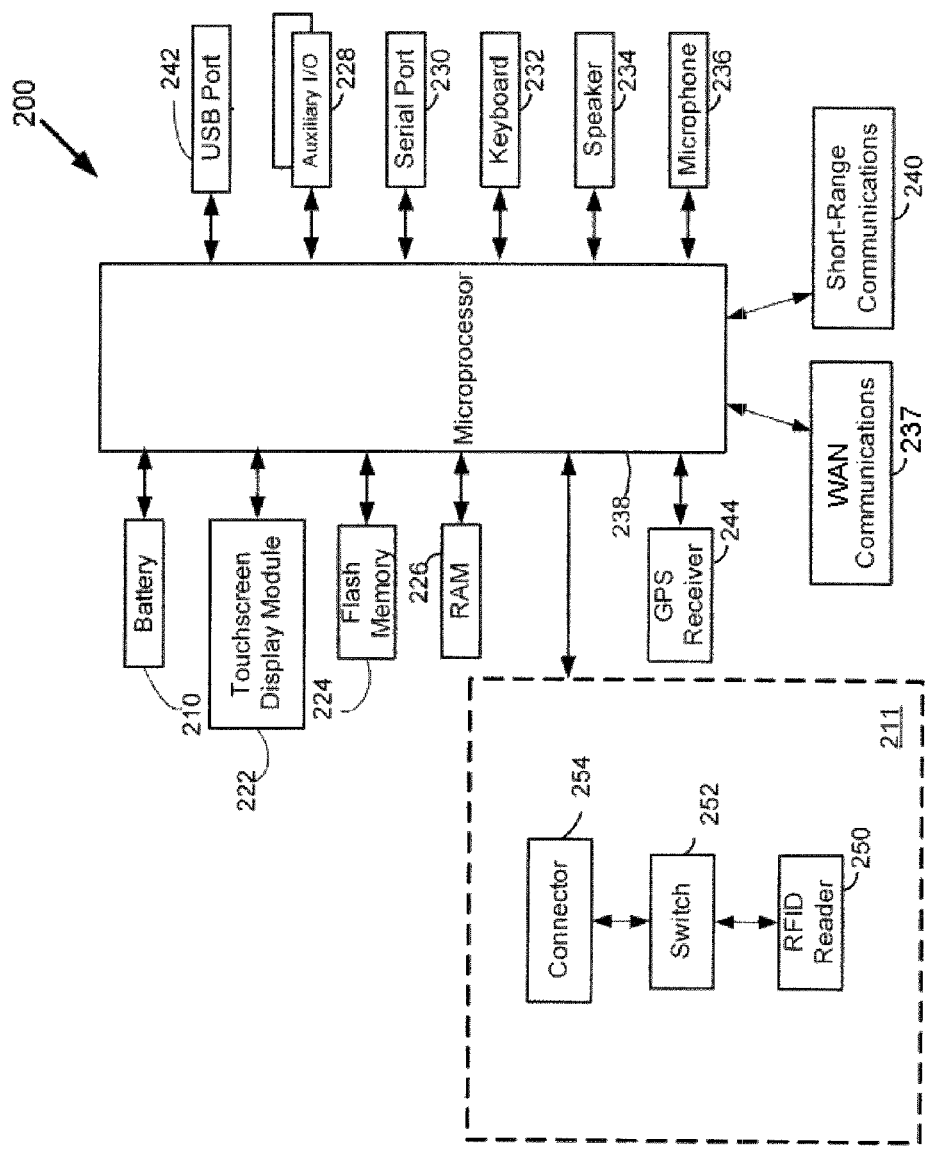
FIG. 2 is block diagram illustrating components of the mobile computer of FIG. 1.

Referring now to FIG. 2, a block diagram illustrating an example of the logical structure of mobile computer 100 is shown. Mobile computer 100 includes a microprocessor 238 for controlling general operation of the mobile computer 100. The microprocessor 238 also interacts with functional device subsystems such as: a data capture subsystem 211; display 104; a flash memory 224; random access memory (RAM) 226; auxiliary input/output (I/O) subsystems 228; serial port 230; keyboard 106; speaker 234; microphone 236; WAN communication subsystem 237; and a short-range communications subsystem 240, such as a Bluetooth™ transceiver for example.

Mobile computer 100 includes a power source 210, such as a rechargeable battery which may also be removable and replaceable from the mobile computer. Mobile computer 100 may also include a location device 244, such as a GPS receiver for example, for receiving location information.

Operating system software used by the microprocessor 238 may be stored in a persistent store such as flash memory 224, which may alternatively be a read-only memory (ROM), disk drive or other suitable storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the mobile computer 100. A predetermined set of applications, which control basic device operations, may be installed on the mobile computer 100 during its manufacture. These basic operations typically include data and voice communication applications, for example. Additionally, applications may also be subsequently loaded onto the mobile computer device 100 through the WAN communication subsystem 237, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of the mobile computer 100 and may provide enhanced on-device features, communication-related features, or both.

As will be apparent to those skilled in field of communications, the particular design of the WAN communication subsystem 237 depends on the communication network in which mobile computer 100 is intended to operate, and may include communication functionalities such as Wi-Fi based on 802.11 standards, 3G standards, Long Term Evolution (LTE), WiMax, 4G standards and the like.

Data capture subsystem 211 preferably includes an internal RFID reader 250 which is coupled, via a switch 252, to antenna connector 254.

As will be apparent to those of skill in the art, switch 252 can be a mechanical switch directly operated by a user of mobile computer 100, or can be an electronic switch operable by microprocessor 238 in response to software instructions executed thereon and/or input from a user of mobile computer 100.

While in the present embodiment it is preferred that RFID reader 250 be located internal to mobile computer 100, the present invention is not so limited and data capture subsystem 211 can be external to mobile computer 100, such as an RFID reader backpack, or other external unit. Whether data capture subsystem 211 is internal or external, an appropriate direct, or indirect, data connection is provided between RFID reader 250 and microprocessor 238 to allow data to be transferred therebetween.

The display module 222 is used to visually present an application's graphical user interface (GUI) to the user. Depending on the type of mobile computer 100, the user can have access to various types of input devices, such as, for example, a scroll wheel, trackball, light pen and/or a touch sensitive screen.

Figure 3A:
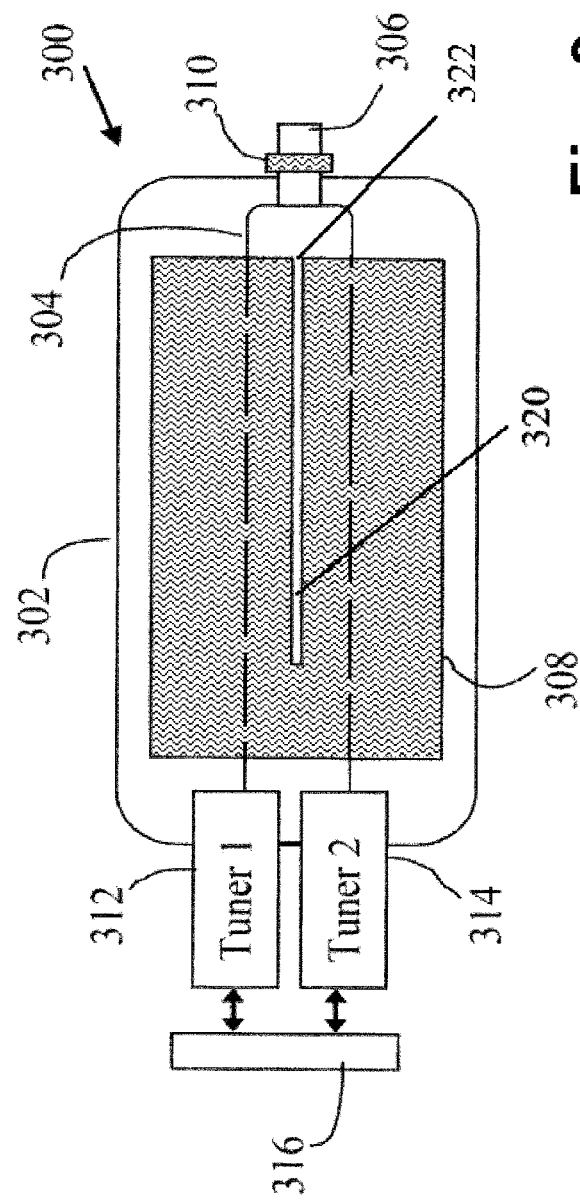
FIG. 3a is a schematic view of the top of a multi-field antenna in accordance with the present invention.

Referring now to FIG. 3a, a multi-field antenna in accordance with the present invention is indicated generally at 300. Multi-field antenna 300 includes a large magnetic loop 302, a small magnetic loop 304, a ferrite nub 306, a first metallic element 308, a second metallic element 310, a first tuner 312, a second tuner 314, and a mobile computer interface 316 which can include connector 254.

In the present embodiment, the mobile computer interface is configured to couple with the external antenna connector 254 on the mobile computer 100 to connect to RFID reader 250. The first tuner 312 is configured to provide impedance matching between the RFID reader 250, which typically has an output impedance of 50 ohms, and the large magnetic loop 302. Similarly, the second tuner 314 is configured to provide impedance matching between the RFID reader 250 and the small magnetic loop 304. Which magnetic loop, and its corresponding tuner, is activated depends on the position of the switch 252.

The large magnetic loop 302 is generally rectangular in shape and has one or more turns of wire. The large magnetic loop 302 provides a relatively large volume field (380 in FIG. 3b) and can read a large population of RFID tags within its range. As will be apparent to those of skill in the art, the volume of the field can be shaped as a sphere, ovoid or other shape, as desired, by the particular design and arrangement of large magnetic loop 302 and other elements of the multi-field antenna.

Figure 3B:
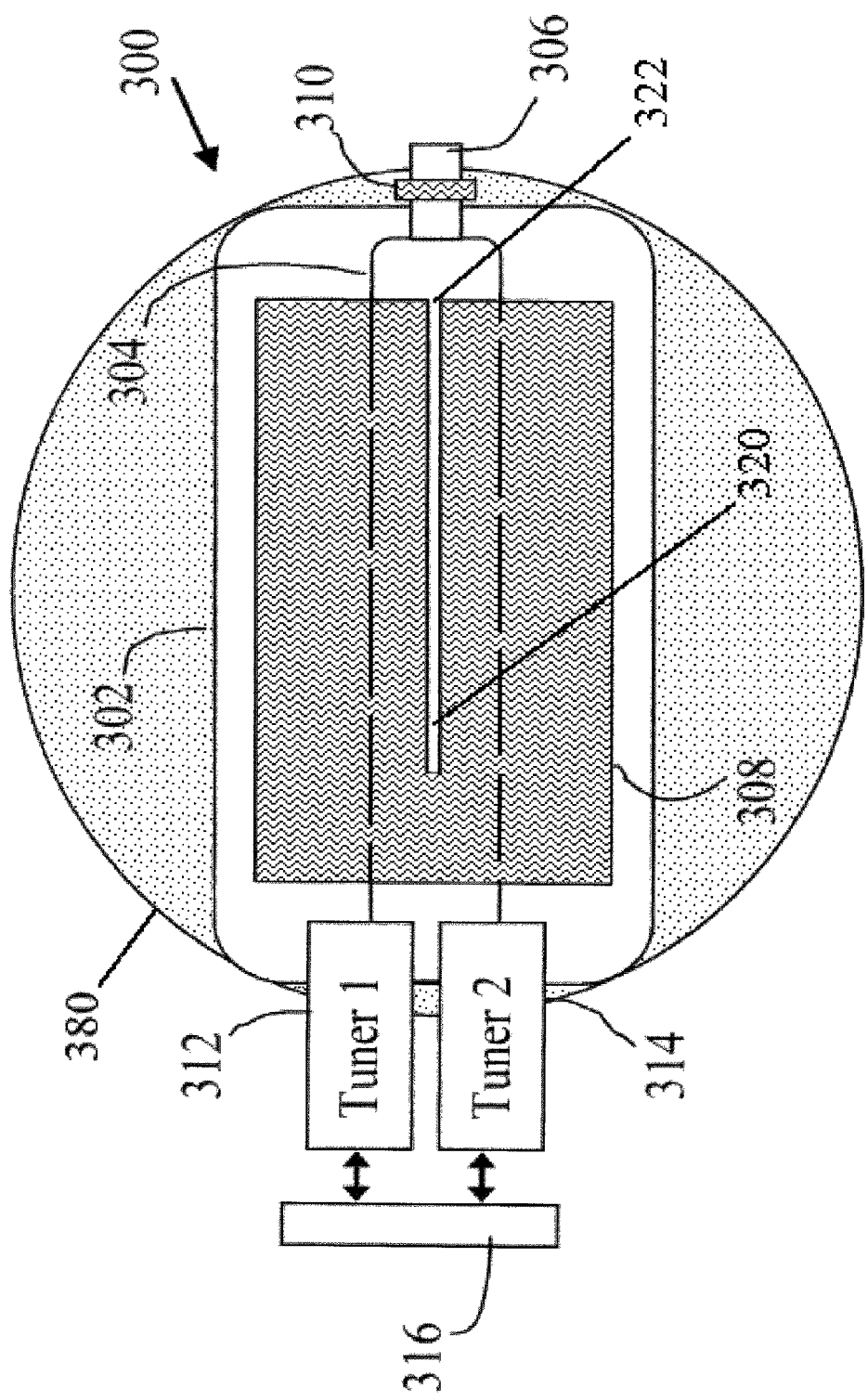
FIG. 3b shows the multi-field antenna of FIG. 3a with a wide field selected.

An example application for which the large magnetic loop 302 could be useful is an inventory application. In the present embodiment, the large magnetic loop 302 is configured to read RFID tags at a distance of up to approximately 5 cm to 15 cm with an ovoid-shaped field. The large volume field activated by the large magnetic loop 302 is shown in FIG. 3b.

First metallic element 308 is a solid metal element that is generally rectangular in shape and is sized smaller than the large magnetic loop 302 but large enough to cover a substantial portion of the small magnetic loop 304. Preferably, the first metallic element 308 is not completely closed-off and instead includes a slot 320. The slot 320 extends along a length of the first metallic element 302 from an aperture 322 at one end of the first metallic element 308 to a point proximal an opposite end of the first metallic element 308. Thus, the structural integrity of the first metallic element 308 as a single entity is maintained. As will be understood by those of skill in the art, the dimensions of slot 320 helps define the field volume and shape of the small magnetic loop 304.

The small magnetic loop 304 is generally rectangular in shape and has one or more turns of wire. The small magnetic loop 304 provides a smaller volume field than large magnetic loop 302 (385 in FIG. 3c) and can read a population of RFID tags within the volume. The size and shape of the smaller volume field is influenced by the dimensions of the slot 320, as the magnetic field generated by the small magnetic loop 304 radiates therethrough. In a present embodiment, the small magnetic loop 304 is configured to create a field which can read RFID tags at a distance of approximately 2 cm to 3 cm and which has a substantially elongate shaped field. The smaller volume field activated by the small magnetic 304 loop is shown at 385 in FIG. 3c.

In the illustrated embodiment, the large magnetic loop 302 and the small magnetic loop 304 are in substantially the same plane and the first metallic element 308 is minimally offset, either above or below the small magnetic loop 304. Alternatively, the large magnetic loop 302 and the first metallic element 308 can be in substantially the same plane and the small magnetic loop 304 can be minimally offset, either above or below the first metallic element 308. Yet alternatively, each of the large magnetic loop 302, the small magnetic loop 304 and the first metallic element 308 can be minimally offset, so that each is in a different plane.

Ferrite nub 306 is coupled with the small magnetic loop 304 at an end adjacent to aperture 322. In the illustrated embodiment, ferrite nub 306 is cylindrical in shape and is thereby configured to provide a pointed (e.g.—ellipsoidal) volume field (390 in FIG. 3c) which allows interacting with a RFID tag with high accuracy. Further, in a present embodiment, the composition of the ferrite nub 306, as well as its size and shape, are selected to provide a target frequency. In a present embodiment, this target frequency is 13.56 MHz, although other target frequencies can be selected as desired.

Figure 3C:
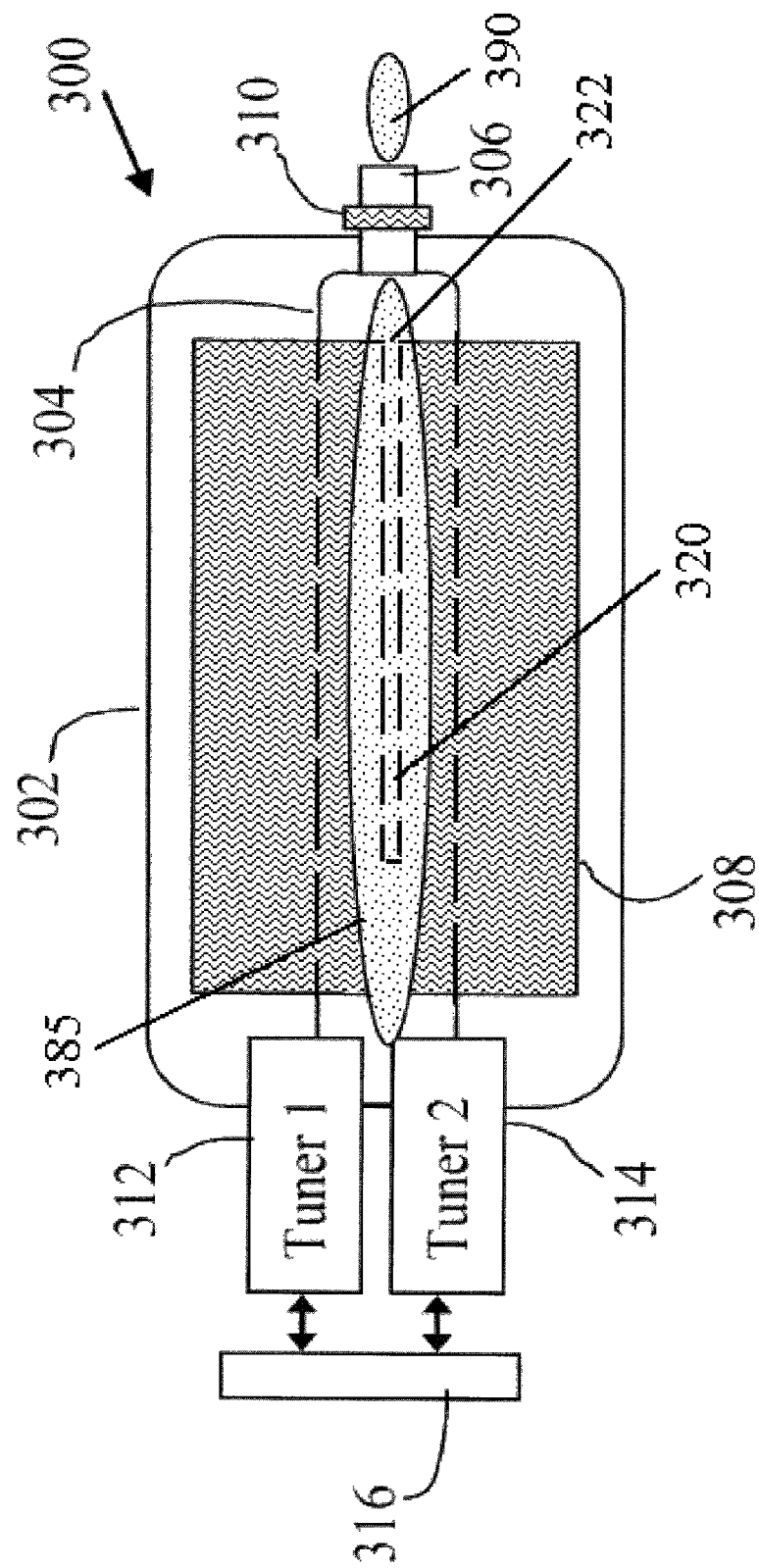
FIG. 3c shows the multi-field antenna of FIG. 3a with a narrow field and a point field selected.

Second metallic element 310 is coupled with the ferrite nub 306 to help localize pointed volume field 390, thereby inhibiting reading RFID tags neighbouring the target RFID tag. In the present embodiment, second metallic element 310 is an annular ring configured to fit snugly about the ferrite nub 306, proximal the small magnetic loop 304. Accordingly, the pointed volume field 390 is localized in a direction away from the small magnetic loop 304, as illustrated in FIG. 3c.

As will be apparent to those of skill in the art, the ability to use pointed volume field 390 can provide advantages relative to a multi-field antenna which only offers large volume and small volume fields, but it is contemplated that in some circumstances pointed volume field 390, and the elements used to form it, can be omitted from multi-field antenna 300 without departing from the scope of the present invention.

As will be apparent to those of skill in the art, first metallic element 308 acts as a mask, masking large magnetic loop 302 from small magnetic loop 304. That is, when the large magnetic loop 302 is active, a current can be induced in the small magnetic loop 304. In turn, the induced current generates a magnetic field which may interfere with the operation of the large magnetic loop 302. Accordingly, the first metallic element 308 inhibits these effects, thereby masking the large magnetic loop 302 from the small magnetic loop 304.

In operation, only one of large magnetic loop 302 or small magnetic loop 304 is activated at a time. The other magnetic loop is left open circuited, or has a load applied to it, to further inhibit interference and the selection of which magnetic loop is activated is made with switch 252.

As previously mentioned, the illustrated embodiment of the present invention is designed specifically for a frequency of 13.56 MHz used in HF (high frequency) RFID systems. However, it is contemplated that multi-field antenna 300 can be designed to operate at different frequencies, used in other RFID or wireless transponder systems as desired.

Further, while the description above only discusses providing a first tuner 312 and a second tuner 314 and the corresponding large magnetic loop 302 and small magnetic loop 304, it will be apparent to those of skill in the art that multi-field antenna 300 can be constructed with additional tuners, magnetic loops and metallic elements to provide additional selectable field volumes and/or shapes if desired.

Figure 4A:
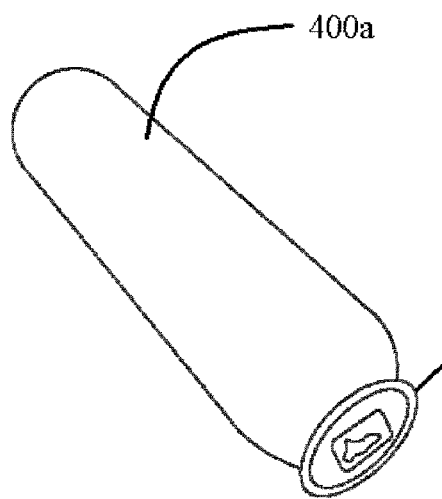
FIG. 4a is a perspective view of the side and end of a test tube including a wireless communication transponder.
Figure 4B:
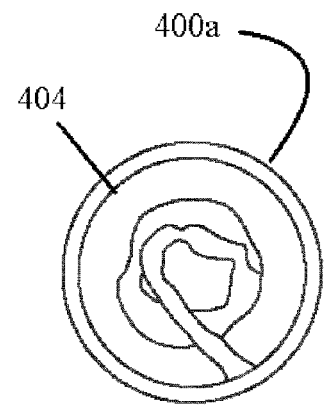
FIG. 4b is an end view of the test tube of FIG. 4a showing the wireless communication transponder.
Figure 5:
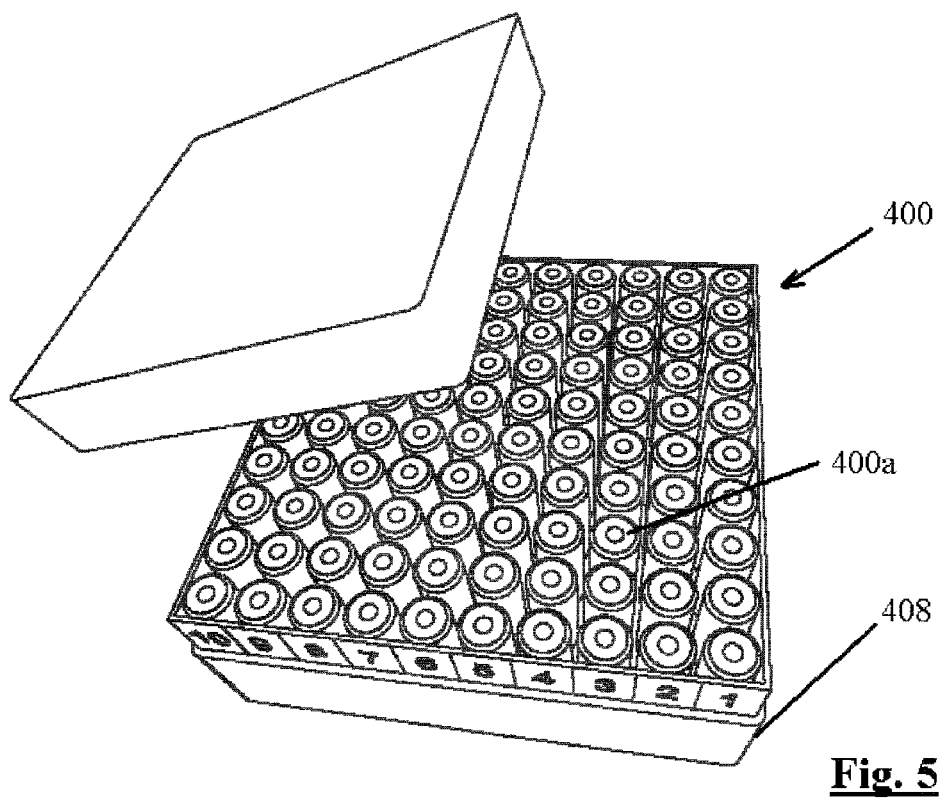
FIG. 5 shows a perspective view of the top and sides of a box storing the test tubes of FIGS. 4a and 4b.

A sample application of the operation of the multi-field antenna 300, to locate a target test tube containing a medical specimen is described as follows. In the present example, an operator of a mobile computer 100 desires to locate a target test tube 400a amongst a plurality of test tubes 400. An example of such a test tube 400a is illustrated in FIGS. 4a and 4b. Each of the test tubes 400 includes a unique RFID tag 404 and can be stored in one of an array of compartments in one or more boxes 408 or other storage arrays, as indicated in FIG. 5.

Before beginning to search for the particular target test tube 400a, the operator attaches the multi-field antenna 300 to the mobile computer 100, if it is not already attached, via connector 254 and uses switch 252 to select the large volume field 380 offered by the large magnetic loop 302 (as shown in FIG. 3b). In this case, switch 252, whether operated manually by the user, or under software control, enables the first tuner 312 for activating the large magnetic loop 302 and, in the present embodiment, the small magnetic loop 304 is open-circuited to inhibit interference with the operation of the large magnetic loop 302. Alternatively, a load or resistor can be applied to the small magnetic loop 304 to detune it to further inhibit interference with the operation of the large magnetic loop 302.

Once the large magnetic loop 302 has been activated, the operator uses the large volume field 380 of the multi-field antenna 300 to scan two or more boxes 408 to determine in which of the boxes 408 the target test tube 400a is located ("the target box"). When mobile computer device 100 and multi-field antenna 300 are adjacent a box 408 which contains target test tube 400a, mobile computer device 100 will provide to the user a positive indication of the presence of target test tube 400a within large volume field 380. Thus the user will have a first estimate (i.e.—within the target box 408) of the location of target test tube 400a.

Once the target box 408 has been located, the switch 252 is used, either under software control or manually by the operator, to switch multi-field antenna 300 from operating with the large volume field 380 to operating with the smaller volume field 385 of the small magnetic loop 304 in order to further narrow the search for the target test tube 400a. Because of the resolution of the large volume 380 of the large magnetic loop 302, the operator cannot efficiently determine where in the array within the target box 408 of test tubes 400 the target test tube 400a is positioned.

Switch 252 enables the second tuner 314 for tuning the small magnetic loop 304 and, in the present embodiment, the large magnetic loop 302 is open-circuited to inhibit interference with the operation of the small magnetic loop 304. Alternatively, a load or resistor can be applied to the large magnetic loop 302 to further inhibit interference with the operation of the small magnetic loop 304.

Once the small magnetic loop 304 has been enabled, the operator uses the smaller volume field 385 of the multi-field antenna 300 to scan the rows or columns of the array within the located box 408 to determine in which row or column (depending upon the orientation of multi-field antenna 300 as smaller volume field 385 is preferably elongate in one direction and narrower in the other, as seen in FIG. 3c) the target test tube 400a is located. Again, mobile computer device 100 will provide to the user a positive indication of the presence of target test tube 400a within smaller volume field 385. Thus the user will have a second, more accurate, estimate (i.e.—within an identified row or column of the target box 408) of the location of target test tube 400a.

Once the row or column has been determined, the operator uses the pointed field 390 of the ferrite nub 306 in order to further narrow the search for the target test tube. Because of the resolution of the smaller volume field 385 of the small magnetic loop 304, the operator may not be able to efficiently determine where the target test tube 400a is positioned in the row or column of the array solely with smaller volume field 385.

At this point, it is not required to further activate the switch 252, because the ferrite nub 306 is coupled with the small magnetic loop 304. The operator uses the pointed volume field 390 of the ferrite nub 306 to locate the target test tube 400a within the row or column. Again, mobile computer device 100 will provide to the user a positive indication of the presence of target test tube 400a within pointed volume field 390. Thus the user will have a third, still more accurate, estimate (i.e.—within a particular storage location of the array of locations in box 408) of the location of target test tube 400a.

It will be appreciated by a person of ordinary skill in the art that the time taken to locate a target item, such as a test tube 400, even in a close packed array of target items can be dramatically reduced using the multi-field antenna 300 as described herein A further sample application of the operation of the multi-field antenna 300 is described as follows. In the present example, an operator of a mobile computer 100 desires to take an inventory of the test tubes 400 stored in an array in each of a plurality of boxes 408. Each of the test tubes 400, as well as each of the boxes 408 includes an RFID tag having a unique identifier. Further, each storage array comprises a plurality of predefined rows and columns. In the illustrated embodiment, the array comprises ten rows and ten columns for storage locations for one hundred test tubes 400. Each position in the array is identified by a unique number from one to one hundred.

Before beginning to take inventory, the operator attaches the multi-field antenna 300 to the mobile computer 100, if it is not already attached, and selects the large volume field 380 offered by the large magnetic loop 302. Accordingly, the switch 252 enables first tuner 312 for tuning the large magnetic loop 302. As before, in the present embodiment the small magnetic loop 304 is open-circuited to inhibit interference with the operation of the large magnetic loop 302. Alternatively, a load or resistor can be applied to the small magnetic loop 304 to further inhibit interference with the operation of the large magnetic loop 302.

Once the large magnetic loop 302 has been activated, the operator uses the large volume field 380 of the multi-field antenna 300 to scan a box 400 to determine its identifier as well as the identifiers of the test tubes 400 contained therein. At this point, mobile computer device 100 can determine the particular test tubes 400 in the scanned box 408.

Once the box 408 has been scanned with the large volume field 380, the operator switches from the large volume field 380 to the smaller volume field 385 of the small magnetic loop 304 in order to further narrow the search for the target test tube 400a.

Accordingly, the switch 252 enables the second tuner 314 for tuning the small magnetic loop 304. As before, in the present embodiment the large magnetic loop 302 is open-circuited to inhibit interference with the operation of the small magnetic loop 304. Alternatively, a load or resistor can be applied to the large magnetic loop 302 to further inhibit interference with the operation of the small magnetic loop 304.

Once the small magnetic loop 304 has been activated, the operator uses the smaller volume field 385, with its elongate shape, of multi-field antenna 300 to scan each of the rows (or columns) in a predefined order. For example, the rows can be scanned from row one to row ten and, similarly, each of the columns (or rows) are scanned from column one to column ten. As each row, or column is scanned, mobile computer device 100 records the identity of each test tube 400 in turn, in combination with the row or column number. Thus, once the rows and columns have been scanned, software on the mobile computer device 100 can arrange the scanned test tubes 400 into their proper positions within the storage array of the identified box 408. If desired, the operator can use the pointed volume field 390 of the ferrite nub 306 in order to validate the position of the test tubes 400 as determined by the software. At this point, it is not required to further activate the switch 252, because the ferrite nub 306 is coupled with the small magnetic loop 304.

Although the invention has been described with reference to certain specific embodiments, various modifications thereof will be apparent to those skilled in the art without departing from the scope of the invention as defined by the appended claims.

For example, although both the large metallic loop 302, the first metallic element 308 and the small metallic loop are described herein as being generally rectangular in shape, other shapes may be effectively employed, if desired.

Examples of other possible shapes include circular, oval, and the like. Similarly, the shape of the ferrite nub 306 and the second metallic element 310 may also differ from their described shapes and suitable materials other than ferrite, as will occur to those of skill in the art, can be employed for nub 306.

Further, in the embodiments described above, the switch 252 is implemented on the mobile computer 100. However, the switch 252 may also be implemented on the multi-field antenna 300. Further, as mentioned, the switch 252 can be implemented in either hardware or software or a combination of both.

Similarly, in the embodiments described above, the first tuner 312 and the second tuner 314 are implemented on the multi-field antenna 300. However, first tuner 312 and the second tuner 314 may be implemented on the mobile computer 100 instead.

Yet further, the multi-field antenna 300 can be an external, paddle antenna or it can be integrated into cap 108, or other portion of main body 102, of the mobile computer 100. These and other implementations will become apparent to a person of ordinary skill in the art.

We claim:

1. A multi-field antenna configured to receive a signal over one field selected from a plurality of different fields of the antenna, the multi-field antenna comprising:
    a first magnetic loop;
    a first tuner to tune the first magnetic loop to provide a first volume field for reading data;
    a second magnetic loop;
    a second tuner to tune the second magnetic loop to provide a second volume field for reading data, the second volume field being smaller than the first volume field;
    a first metallic element configured to cover at least a portion of the second magnetic loop, the first metallic element creating a mask for the first magnetic loop from the second magnetic loop, the first metallic element comprising a slot extending along a length of the first metallic element from one end of the first metallic element to a point proximal an opposite end of the first metallic element, wherein the field area of the second volume field is defined, in part, based on the dimension of the slot;
    a switch to configure the first tuner and the second tuner to select the one field of the plurality of fields; and
    an interface to connect the multi-field antenna with a signal processing device operable to receive and process the signal.

2. The multi-field antenna of claim 1, wherein the slot further comprises an aperture at the one end of the first metallic element and the multi-field antenna further comprises a ferrite nub coupled to the second magnetic loop at an end adjacent the aperture, the ferrite nub configured to provide a third volume field, the third volume field being smaller than the second volume field.

3. The multi-field antenna of claim 2, further comprising a second metallic element configured to direct the third field away from the second magnetic loop.

4. The multi-field antenna of claim 1, wherein the signal processing device comprises an RFID reader.

5. The multi-field antenna of claim 4, wherein the signal processing device further comprises a mobile computer.

6. The multi-field antenna of claim 5, wherein the switch is operable by software executing on the mobile computer.

7. The multi-field antenna of claim 1, wherein the first magnetic loop is substantially rectangular in shape.

8. The multi-field antenna of claim 1, wherein at least one of the combination of the first magnetic loop and the second magnetic loop, the first magnetic loop and the first metallic element or the first magnetic loop are in the same plane.

9. The multi-field antenna of claim 1, wherein the second magnetic loop and the first metallic element are in different planes.

10. The multi-field antenna of claim 1, wherein, when a first field is selected, the first magnetic loop is activated and the second magnetic loop is deactivated.

11. The multi-field antenna of claim 10, wherein the second magnetic loop is deactivated by at least one of providing the second magnetic loop with an open circuit or connecting a load across the second magnetic loop.

12. The multi-field antenna of claim 1, wherein the switch is provided on the multi-field antenna.

13. The multi-field antenna of claim 1, wherein when a second field is selected, the second magnetic loop is activated and the first magnetic loop is deactivated.

14. The multi-field antenna of claim 13, wherein the first magnetic loop is deactivated by at least one of providing the first magnetic loop with an open circuit or connecting a load across the first magnetic loop.

15. A mobile computer device comprising:
    an RFID reader;
    memory having stored instructions;
    a microprocessor configured to implement the stored instructions for receiving and processing a signal from the RFID reader; and
    a multi-field antenna connected to the RFID reader, the multi-field antenna operable to receive a signal over one field selected from a plurality of different fields of the multi-field antenna and comprising:
        a first magnetic loop;
        a first tuner to tune the first magnetic loop to provide a first volume field for reading data from RFID tags;
        a second magnetic loop;
        a second tuner to tune the second magnetic loop to provide a second volume field for reading data from RFID tags, the second volume field being smaller than the first volume field;
        a first metallic element configured to cover at least a portion of the second magnetic loop, the first metallic element creating a mask for the first magnetic loop from the second magnetic loop, the first metallic element comprising a slot extending along a length of the first metallic element from one end of the first metallic element to a point proximal an opposite end of the first metallic element, wherein the field area of the second volume field is defined, in part, based on the dimension of the slot; and
        a switch to configure the first tuner and the second tuner to select the one field from the plurality of fields.

16. The mobile computer of claim 14, wherein the slot further comprises an aperture at the one end of the first metallic element and the multi-field antenna further comprises a ferrite nub coupled to the second magnetic loop at an end adjacent the aperture, the ferrite nub configured to provide a third volume field, the third volume field being smaller than the second volume field.

17. The mobile computer of claim 15, wherein the switch is controlled by the microprocessor.

18. The mobile computer of claim 15, wherein the memory further includes instructions for automatically identifying a position of each of a plurality of items stored in an array, wherein each of the plurality of items are tagged with a device configured to store and transmit a unique identifier after rows columns of the array have been scanned using the multi-field antenna.

* * * * *